United States Patent
Dahlberg et al.

(10) Patent No.: US 10,791,140 B1
(45) Date of Patent: Sep. 29, 2020

(54) SYSTEMS AND METHODS FOR ASSESSING CYBERSECURITY STATE OF ENTITIES BASED ON COMPUTER NETWORK CHARACTERIZATION

(71) Applicant: BitSight Technologies, Inc., Boston, MA (US)

(72) Inventors: Daniel Dahlberg, Somerville, MA (US); Austin Payne Allshouse, Raleigh, NC (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/775,840

(22) Filed: Jan. 29, 2020

(51) Int. Cl.
| | |
|---|---|
| H04L 29/06 | (2006.01) |
| H04L 29/12 | (2006.01) |
| H04L 12/58 | (2006.01) |
| H04L 12/28 | (2006.01) |
| G06F 40/40 | (2020.01) |

(52) U.S. Cl.
CPC ...... *H04L 63/1433* (2013.01); *H04L 61/2007* (2013.01); *G06F 40/40* (2020.01); *H04L 12/28* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 5,867,799 A | 2/1999 | Lang et al. | |
| 6,016,475 A | 1/2000 | Miller et al. | |
| 6,792,401 B1 | 9/2004 | Nigro et al. | |
| 7,062,572 B1 | 6/2006 | Hampton | |
| D525,264 S | 7/2006 | Chotai | |
| D525,629 S | 7/2006 | Chotai | |

(Continued)

FOREIGN PATENT DOCUMENTS

| | | |
|---|---|---|
| WO | WO-2017/142694 A1 | 8/2017 |
| WO | WO-2019/023045 A1 | 1/2019 |

OTHER PUBLICATIONS

Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).*

(Continued)

*Primary Examiner* — Jeremiah L Avery
(74) *Attorney, Agent, or Firm* — Goodwin Procter LLP

(57) ABSTRACT

Computer-implemented methods are provided for assessing the cybersecurity state of entities based on computer network characterization. The exemplary method can include obtaining, for one or more computer networks of a plurality of computer networks associated with an entity, a network dataset including a service set identifier (SSID); and obtaining a plurality of Internet Protocol (IP) addresses associated with the entity. The method can further include determining whether each of the plurality of computer networks includes a public network or a private network based on the network dataset; and assessing a cybersecurity state of the entity based on an evaluation of security characteristics of the IP addresses attributed to the private network, excluding security characteristics of the IP addresses attributed to the public network.

28 Claims, 5 Drawing Sheets

(56) References Cited

U.S. PATENT DOCUMENTS

| | | |
|---|---|---|
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny |
| 7,650,570 B2 | 1/2010 | Torrens |
| 7,747,778 B1 | 6/2010 | King |
| 7,748,038 B2 | 6/2010 | Olivier et al. |
| 7,827,607 B2 | 11/2010 | Sobel et al. |
| D630,645 S | 1/2011 | Tokunaga |
| 7,971,252 B2 | 6/2011 | Lippmann et al. |
| D652,048 S | 1/2012 | Joseph |
| D667,022 S | 9/2012 | LoBosco |
| 8,370,933 B1 | 2/2013 | Buckler |
| 8,429,630 B2 | 4/2013 | Nickolov et al. |
| D682,287 S | 5/2013 | Cong |
| D688,260 S | 8/2013 | Pearcy |
| 8,504,556 B1 | 8/2013 | Rice et al. |
| D691,164 S | 10/2013 | Lim |
| D694,252 S | 11/2013 | Helm |
| D694,253 S | 11/2013 | Helm |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,825,662 B1 | 9/2014 | Kingman et al. |
| D730,918 S | 6/2015 | Park |
| 9,053,210 B2 | 6/2015 | Elnikety |
| 9,075,990 B1 | 7/2015 | Yang |
| D740,847 S | 10/2015 | Yampolskiy et al. |
| D740,848 S | 10/2015 | Bolts |
| D741,351 S | 10/2015 | Kito |
| D746,832 S | 1/2016 | Pearcy |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park |
| D754,696 S | 4/2016 | Follett |
| D756,371 S | 5/2016 | Bertnick |
| D756,372 S | 5/2016 | Bertnick |
| D756,392 S | 5/2016 | Yun |
| D759,084 S | 6/2016 | Yampolskiy et al. |
| D759,689 S | 6/2016 | Olson |
| 9,372,994 B1 | 6/2016 | Yampolskiy et al. |
| D760,782 S | 7/2016 | Kendler |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,424,333 B1 | 8/2016 | Bisignani |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo |
| D775,635 S | 1/2017 | Raji |
| D776,136 S | 1/2017 | Chen |
| D776,153 S | 1/2017 | Yampolskiy et al. |
| D777,177 S | 1/2017 | Chen |
| 9,560,072 B1 | 1/2017 | Xu |
| D778,927 S | 2/2017 | Bertnick |
| D778,928 S | 2/2017 | Bertnick |
| D779,512 S | 2/2017 | Kimura |
| D779,514 S | 2/2017 | Baris |
| D779,531 S | 2/2017 | List |
| D780,770 S | 3/2017 | Sum |
| D785,009 S | 4/2017 | Lim |
| D785,010 S | 4/2017 | Bachman |
| D785,016 S | 4/2017 | Berwick |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne |
| D789,947 S | 6/2017 | Sun |
| D789,957 S | 6/2017 | Wu |
| D791,153 S | 7/2017 | Rice |
| D791,834 S | 7/2017 | Eze |
| D792,427 S | 7/2017 | Weaver |
| D795,891 S | 8/2017 | Kohan |
| 9,736,019 B2 * | 8/2017 | Hardison ............... H04W 4/80 |
| D796,523 S | 9/2017 | Bhandari |
| D801,989 S | 11/2017 | Iketsuki |
| D803,237 S | 11/2017 | Wu |
| D804,528 S | 12/2017 | Martin |
| D806,735 S | 1/2018 | Olsen |
| D806,737 S | 1/2018 | Chung |
| D809,523 S | 2/2018 | Lipka |
| D812,633 S | 3/2018 | Saneii |
| D814,483 S | 4/2018 | Gavaskar |
| D815,119 S | 4/2018 | Chalker |
| D815,148 S | 4/2018 | Martin |
| D816,105 S | 4/2018 | Rudick |
| D816,116 S | 4/2018 | Selassie |
| 9,954,893 B1 | 4/2018 | Zhao et al. |
| D817,970 S | 5/2018 | Chang |
| D817,977 S | 5/2018 | Kato |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,348,755 B1 * | 7/2019 | Shavell ............. H04W 12/1204 |
| 10,412,083 B2 | 9/2019 | Zou et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D880,512 S | 4/2020 | Greenwald et al. |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0133689 A1 * | 7/2004 | Vasisht ............... H04L 61/2061 709/228 |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0278726 A1 | 12/2005 | Cano |
| 2006/0036335 A1 | 2/2006 | Banter |
| 2006/0107226 A1 | 5/2006 | Matthews |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2007/0016948 A1 | 1/2007 | Dubrovsky et al. |
| 2007/0067845 A1 | 3/2007 | Werner et al. |
| 2007/0143851 A1 | 6/2007 | Nicodemus et al. |
| 2007/0179955 A1 | 8/2007 | Croft et al. |

(56) References Cited

U.S. PATENT DOCUMENTS

| | | |
|---|---|---|
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0162931 A1 | 7/2008 | Lord et al. |
| 2008/0172382 A1 | 7/2008 | Prettejohn |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1* | 12/2009 | Nix ............... H04L 61/2575 370/331 |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra |
| 2011/0145576 A1 | 6/2011 | Bettan |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0231395 A1 | 9/2011 | Vadlamani et al. |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0198558 A1 | 8/2012 | Liu et al. |
| 2012/0215892 A1 | 8/2012 | Wanser |
| 2012/0255027 A1 | 10/2012 | Kanakapura et al. |
| 2012/0291129 A1 | 11/2012 | Shulman et al. |
| 2013/0014253 A1 | 1/2013 | Vivian et al. |
| 2013/0060351 A1 | 3/2013 | Imming et al. |
| 2013/0080505 A1 | 3/2013 | Nielsen et al. |
| 2013/0086521 A1 | 4/2013 | Grossele |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0227078 A1 | 8/2013 | Wei et al. |
| 2013/0291105 A1 | 10/2013 | Zheng |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores |
| 2014/0006129 A1 | 1/2014 | Heath |
| 2014/0019196 A1 | 1/2014 | Wiggins |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0204803 A1 | 7/2014 | Nguyen et al. |
| 2014/0244317 A1 | 8/2014 | Roberts et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0334336 A1* | 11/2014 | Chen ............... H04W 72/0406 370/254 |
| 2014/0337633 A1 | 11/2014 | Yang et al. |
| 2015/0033331 A1 | 1/2015 | Stern et al. |
| 2015/0033341 A1 | 1/2015 | Schmidtler et al. |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0036849 A1 | 2/2016 | Zakian |
| 2016/0065613 A1 | 3/2016 | Cho et al. |
| 2016/0119373 A1 | 4/2016 | Fausto et al. |
| 2016/0140466 A1 | 5/2016 | Sidebottom |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2016/0364496 A1 | 12/2016 | Li |
| 2016/0373485 A1 | 12/2016 | Kamble |
| 2017/0048267 A1 | 2/2017 | Yampolskiy et al. |
| 2017/0063901 A1 | 3/2017 | Muddu et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0103043 A1 | 4/2018 | Kupreev et al. |
| 2018/0123934 A1 | 5/2018 | Gissing et al. |
| 2018/0124110 A1 | 5/2018 | Hunt et al. |
| 2018/0139180 A1 | 5/2018 | Napchi et al. |
| 2018/0157468 A1 | 6/2018 | Stachura |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0089711 A1 | 3/2019 | Faulkner |
| 2019/0098025 A1 | 3/2019 | Lim |
| 2019/0140925 A1 | 5/2019 | Pon et al. |
| 2019/0147378 A1 | 5/2019 | Mo et al. |
| 2019/0215331 A1* | 7/2019 | Anakata ............... H04L 67/10 |
| 2019/0303574 A1 | 10/2019 | Lamay et al. |
| 2019/0379632 A1 | 12/2019 | Dahlberg et al. |

(56) References Cited

U.S. PATENT DOCUMENTS

| | | |
|---|---|---|
| 2019/0392252 A1 | 12/2019 | Fighel et al. |
| 2020/0053127 A1 | 2/2020 | Brotherton et al. |
| 2020/0074084 A1 | 3/2020 | Dorrans et al. |

OTHER PUBLICATIONS

Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).*

Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber=1258471 (Year: 2003).*

Security Warrior, Cyrus Peikari, Anton, Chapter 8: Reconnaissance, 6 pages.

Snort Intrusion Monitoring System, http://archive.oreilly.com/pub/h/1393, date accessed Sep. 28, 2016, 3 pages.

Stone-Gross, Brett, et al., "FIRE: Finding Rogue Networks," 10 pages.

Taleb, Nassim N., et al., "The Six Mistakes Executives Make in Risk Management," Harvard Business Review, Oct. 2009, 5 pages.

The CIS Security Metrics v1.0.0, The Center for Internet Security, May 11, 2009, 90 pages.

The Fair Credit Reporting Act (FCRA) of the Federal Trade Commission (FTC), Jul. 30, 2004, 86 pages.

The Financial Institution Shared Assessments Program, Industry Positioning and Mapping Document, BITS, Oct. 2007, 44 pages.

Wikipedia, https://en.wikipedia.org/wiki/Crowdsourcing, date accessed Sep. 28, 2016, 25 pages.

Williams, Leevar, et al., "GARNET: A Graphical Attack Graph and Reachability Network Evaluation Tool," MIT Lincoln Library, VizSEC 2009, pp. 44-59.

Williams, Leevar, et al., "An Interactive Attack Graph Cascade and Reachability Display," MIT Lincoln Laboratory, 17 pages.

BitSight, "Cyber Security Myths Versus Reality: How Optimism Bias Contributes to Inaccurate Perceptions of Risk", Jun. 2015, Dimensional Research, pp. 1-9.

PAIR transaction history of U.S. Appl. No. 13/240,572 as of Oct. 7, 2015, application as filed and pending claims, 45 pages.

PAIR transaction history of U.S. Appl. No. 61/386,156 as of Oct. 7, 2015. 2 pages.

PAIR transaction history of U.S. Appl. No. 13/240,572 and pending claims as of Mar. 22, 2016, 10 pages.

PAIR transaction history of U.S. Appl. No. 14/944,484 and pending claims as of Mar. 22, 2016, 4 pages.

Provos et al., "The Ghost in the Browser Analysis of Web-based Malware", 2007 (9 pages).

Li et al., "Finding the Linchpins of the Dark Web: a Study on Topologically Dedicated Hosts on Malicious Web Infrastructures", IEEE, 2013 (15 pages).

Bhilare et al., "Protecting Intellectual Property and Sensitive Information in Academic Campuses from Trusted Insiders: Leveraging Active Directory", SIGUCC, Oct. 2009 (5 pages).

Jin et al, "Identifying and tracking suspicious activities through IP gray space analysis", MineNet, Jun. 12, 2007 (6 pages).

Chuvakin, "SIEM: Moving beyond compliance", RSA White Paper (2010) (16 pages).

PAIR transaction history of U.S. Appl. No. 14/021,585 as of Oct. 7, 2015 and application as filed, 70 pages.

PAIR transaction history and pending claims for U.S. Appl. No. 14/021,585, as of Apr. 29, 2016, 2 pages.

PAIR transaction history, application as filed and pending claims for U.S. Appl. No. 13/240,572 as of Apr. 29, 2016, 46 pages.

PAIR transaction history, application as filed and pending claims for U.S. Appl. No. 14/944,484 as of Apr. 29, 2016, 4 pages.

PAIR transaction history of U.S. Appl. No. 14/021,585 and pending claims as of Mar. 22, 2016, 2 pages.

PAIR transaction history and pending claims for U.S. Appl. No. 14/021,585, as of Nov. 18, 2015, 6 pages.

Application as filed, PAIR transaction history and pending claims of U.S. Appl. No. 13/240,572 as of Nov. 18, 2015, 45 pages.

Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.

Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.

Gephi (gephi.org), accessed on the internet at https://web.archive.org/web/20151216223216/https://gephi.org/; Dec. 16, 2015; 1 page.

mile 2 CPTE Maltego Demo, accessed on the internet at https://www.youtube.com/watch?v=o2oNKOUzPOU; Jul. 12, 2012: 1 page.

"Neo4j (neo4j.com)," accessed on the internet at https://web.archive.org/web/20151220150341/http://neo4j.com:80/developer/guide-data-visualization/; Dec. 20, 2015; 1 page.

"Creating Transparency with Palantir," accessed on the internet at https://www.youtube.com/watch?v=8cbGChfagUA; Jul. 5, 2012; 1 page.

"Palantir Cyber: Uncovering malicious behavior at petabyte scale," accessed on the internet at https://www.youtube.com/watch?v=EhYezV06EE; Dec. 21, 2012; 1 page.

Borgatti, et al., "On Social Network Analysis in a Supply Chain Context," Journal of Supply Chain Management; 45(2): 5-22; Apr. 2009, 18 pages.

Carstens, et al., "Modeling Company Risk and Importance in Supply Graphs," European Semantic Web Conference 2017: The Semantic Web pp. 18-31.

Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.

Jean, "Cyber Security: How to use graphs to do an attack analysis," accessed on the internet at https://linkurio.us/blog/cyber-security-use-graphs-attack-analysis/; Aug. 2014, 11 pages.

"Palantir.com," accessed on the internet at http://www.palantir.com/; Dec. 2015; 2 pages.

KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.

"Maltego XL," accessed on the Internet at https://www.paterva.com/web7/buy/maltegoclients/maltego-xl.php, 5 pages.

Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.

Noel, et al., "Big-Data Architecture for Cyber Attack Graphs, Representing Security Relationships in NoSQL Graph Databases," The MITRE Corporation, 2014, 6 pages.

Wagner, et al., "Assessing the vulnerability of supply chains using graph theory," Int. J. Production Economics 126 (2010) 121-129.

Moradi, et al., "Quantitative Models for Supply Chain Management," IGI Global, 2012, 29 pages.

Joslyn, et al., "Massive Scale Cyber Traffic Analysis: A Driver for Graph Database Research," Proceedings of the First International Workshop on Graph Data Management Experience and Systems (Grades 2013), 6 pages.

"About Neo4j," 1 page.

"Amazon Mechanical Turk," accessed on the internet at https://www.mturk.com/; 7 pages.

"Rapid7 Nexpose Vulnerability Scanner," accessed on the internet at http://www.rapid7.com/products/nexpose/download, 3 pages.

"Tenable Nessus Network Vulnerability Scanner," accessed on the internet at https://www.tenable.com/products/nessus/nessus-professional; 13 pages.

"Computer Network Graph," http://www.opte.org; 1 page.

McNab, "Network Security Assessment," copyright 2004, 56 pages.

(56) References Cited

OTHER PUBLICATIONS

Gilgur, et al., "Percentile-Based Approach to Forecasting Workload Growth" Proceedings of CMG'15 Performance and Capacity International Conference by the Computer Measurement Group. No. 2015 (Year:2015).
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Search Query Report form IP.com (performed Apr. 27, 2020).
Camelo et al., "CONDENSER: A Graph-Based Approach for Detecting Botnets," AnubisNetworks R&D, Amadora, Portugal, 8 pages.
Camelo, "Botnet Cluster Identification," Sep. 2014, 2 pages.
"An Executive View of IT Governance," IT Governance Institute, 2009, 32 pages.
"Agreed Upon Procedures," Version 4.0, BITS, The Financial Institution Shared Assessments Program, Assessment Guide, Sep. 2008, 56 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Master Security Criteria," Version 3.0, BITS Financial Services Security Laboratory, Oct. 2001, 47 pages.
"Plugging the Right Holes," Lab Notes, MIT Lincoln Library, Posted Jul. 2008, retrieved Sep. 14, 2010 from http://www.II.miLedufpublicationsflabnotesfpluggingtherightho! . . . , 2 pages.
"Report on Controls Placed in Operation and Test of Operating Effectiveness," EasCorp, Jan. 1-Dec. 31, 2008, prepared by Crowe Horwath, 58 pages.
"Shared Assessments: Getting Started," BITS, 2008, 4 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business Risk Team, 52 pages.
Artz, Michael Lyle, "NetSPA: A Network Security Planning Architecture," Massachusetts Institute of Technology, May 24, 2002, 97 pages.
Boyer, Stephen, et al., Playing with Blocks: SCAP—Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Computer Network Graph-Bees, http://bioteams.com/2007/04/30/visualizing_complex_networks.html, date accessed Sep. 28, 2016, 2 pages.
Computer Network Graph—Univ. of Michigan, http://people.cst.cmich.edu/liao1q/research.shtml, date accessed Sep. 28, 2016, 5 pagese.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
The Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Johnson, Eric, et al., "Information Risk and the Evolution of the Security Rating Industry," Mar. 24, 2009, 27 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
MaxMind, https://www.maxmind.com/en/about-maxmind, https://www.maxmind.com/en/geoip2-isp-database, date accessed Sep. 28, 20116, 3 pages.
Method Documentation, CNSS Risk Assessment Tool Version 1.1, Mar. 31, 2009, 24 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Nye, John, "Avoiding Audit Overlap," Moody's Risk Services, Presentation, Source Boston, Mar. 14, 2008, 19 pages.
Paxson, Vern, "How The Pursuit of Truth Led Me To Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Rare Events, Oct. 2009, JASON, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=1013603, Apr. 28, 2010, 2 pages.

(56) References Cited

OTHER PUBLICATIONS

The CIS Security Metrics v1.0.0, The Center for Internet Security, May 11, 2009, 90 pages.

* cited by examiner

SYSTEMS AND METHODS FOR ASSESSING CYBERSECURITY STATE OF ENTITIES BASED ON COMPUTER NETWORK CHARACTERIZATION

TECHNICAL FIELD

The following disclosure is directed to methods and systems for assessing the cybersecurity state of entities based on computer network characterization and, more specifically, methods and systems for assessing the cybersecurity state of entities based on characterization of public and/or private computer networks.

BACKGROUND

Public computer networks have become ubiquitous as entities aim to accommodate guests, customers, and persons unaffiliated with the entities in gaining access to the Internet. In many instances, entities (e.g., business owners, service providers, etc.) set up and maintain public networks (e.g., guest Wi-Fi) in places such as cafes, offices, or airports, where members of the public or customers can log on. However, while the ease of accessibility allows customers to conveniently attach to these networks, they are typically minimally secured or not secured against malicious actors. Thus, these networks typically have worse security characteristics than do the more secure private networks. Poorly secured networks can put the entity at greater risk of security breaches.

SUMMARY

Disclosed herein are methods and systems for assessing the cybersecurity state of entities based on computer network characteristics. For example, network characteristics may include: the type of network, the use of the network, the identity of the network, the name of the network, the entity or entities associated with the network, etc. The exemplary methods and systems described herein can determine whether an entity's computer networks (e.g., wired and/or wireless networks) includes a public and/or a private network and determine the cybersecurity state (e.g., security rating) of the entity by excluding security characteristics related to the public network. In some examples, the cybersecurity state of the entity may be more accurately determined by excluding security characteristics associated with public networks as public networks tend to be less secure compared to private networks. Note, however, that the access to some public networks can be controlled (while not necessarily being secure), e.g., where a member of the public requires a key or password to gain access to the public network.

Exemplary systems may characterize computer networks associated with an entity based on service set identifier(s) (SSID(s)) of the wireless network(s), data related to user devices that connect to the network(s) (e.g., wired or wireless network), and/or data related to user email or identifier(s)(e.g., email opened or read on a network, email addresses, web account information, etc.). In some embodiments, the systems may determine the security characteristic(s) of the identified private and/or public networks. In some embodiments, assessing the cybersecurity state of entities can include determining the security ratings for entities based on an evaluation of the security characteristics associated with the private network(s) and by excluding security characteristics associated with the public network(s).

In one aspect, the disclosure features a computer-implemented method including obtaining, for one or more computer networks of a plurality of computer networks associated with an entity, a network dataset including a service set identifier (SSID); and obtaining a plurality of Internet Protocol (IP) addresses associated with the entity. The method further includes determining whether each of the plurality of computer networks includes a public network or a private network based on the network dataset; and assessing a cybersecurity state of the entity based on an evaluation of security characteristics of the IP addresses attributed to the private network, excluding security characteristics of the IP addresses attributed to the public network.

Various embodiments of the exemplary method can include one or more of the following features. Determining whether each of the computer networks includes a public network or a private network based on the network dataset can include determining whether the SSID includes a term including: "guest", "public", "visit", "byod", "free", "customer", and/or "personal", in which the term is in a natural language. The method can include obtaining, for one or more computer network of the plurality of computer networks of the entity, a plurality of network datasets including the network dataset. Each network dataset can include an SSID and can be from a unique time. Determining whether each of the computer networks includes a public network or a private network based on the network dataset can be performed for two or more network datasets of the plurality of network datasets. The time can correspond to a day. Determining whether each of the computer networks includes a public network or a private network based on the network dataset can be performed for three or more network datasets of the plurality of network datasets.

The method can include obtaining one or more SSIDs of common public networks, and blacklisting the SSIDs of the common public networks such that at least one IP address is not attributed to one or more of the common public networks. The method can include obtaining, for each device of a plurality of devices, a device dataset including: (a) cookies, (b) device fingerprints, and/or (c) a device identifier; and determining whether each of the computer networks includes a public network or a private network based on one or more device datasets. Determining whether each of the computer networks includes a public network or a private network based on the device dataset(s) can further include determining whether the device(s) has connected to one or more computer networks of the plurality of computer networks.

If the device has connected to the at least one computer network, determining whether each of the computer networks includes a public network or a private network based on one or more device datasets further includes determining a connection duration and/or connection frequency of the device connected to the computer network(s) in a given time period. The method can further include comparing (i) a first number of devices of the plurality of devices that has connected to the computer network(s) to (ii) a second number of devices typically associated with the computer network(s); and determining that the computer network(s) includes a public network if the first number is greater than the second number. Determining whether each of the computer networks includes a public network or a private network based on the device dataset(s) can include, for a given network of the plurality of computer networks, determining that the given computer network is a public network based on a connection record of the device. The connection record can indicate whether the device previously connected to a different computer network (i) for a longer duration than connecting to the given computer network and/or (ii) more frequently than connecting to the given computer network.

The method can include obtaining, for each user of a plurality of users, an email dataset including one or more of: (i) an indication that the user opened or read an email from an email service provider and network information associated with a client with which the user opened or read the email, or (ii) a user identifier including a user email address and/or web account information; and determining whether each of the computer networks includes a public network or a private network based on one or more email datasets. The network information can indicate a first computer network in which the client was used to open or read the email. The method can further include comparing (i) the first computer network to (ii) at least a second computer network to which the user belongs; and if the first computer network is not the second computer network, determining that the computer network is a public network. The user identifier can indicate a first computer network. The method can further include: comparing (i) the first computer network to (ii) at least a second computer network to which the user belongs; and, if the first computer network is not the second computer network, determining that the computer network is a public network. Determining whether each of the plurality of computer networks includes a public network or a private network based on the network dataset can further include providing at least a portion of the network dataset as input to a trained classifier to determine whether the network is a public network or a private network.

In another aspect, the disclosure features a computer-implemented method including obtaining, for each device of a plurality of devices, a device dataset including: (a) cookies, (b) device fingerprints, and/or (c) a device identifier. The method can include obtaining a plurality of Internet Protocol (IP) addresses associated with the entity; determining, for a plurality of computer networks associated with the entity, whether each of the computer networks include a public network or a private network based on the device datasets; and assessing a cybersecurity state of the entity based on an evaluation of security characteristics of the IP addresses attributed to the private network, excluding security characteristics of the IP addresses attributed to the public network.

Various embodiments of the exemplary method can include one or more of the following features. Determining whether each of the computer networks includes a public network or a private network based on the device datasets can include determining whether the device of the plurality of devices has connected to the computer network based on the device datasets. If the device has connected to the computer network(s), determining whether each of the computer networks includes a public network or a private network based on the device datasets can include determining a connection duration and/or connection frequency of the device connecting to the computer network in a given time period. The method can include comparing (i) a first number of devices of the plurality of devices that has connected to the computer network to (ii) a second number of devices typically associated with the computer network; and determining that the computer network includes a public network if the first number is greater than the second number.

The method can include obtaining, for one or more computer networks of an entity, a network dataset including one or more service set identifiers (SSIDs); and determining whether each of the computer networks includes a public network or a private network based on the network dataset. Determining whether each of the computer networks includes a public network or a private network based on the SSID(s) can include determining whether the SSID includes a term including one or more of: "guest", "public", "visit", "byod", "free", "customer", and/or "personal", in which the term is in a natural language. Determining whether each of the computer networks includes a public network or a private network based on the device datasets can include for a given network of the plurality of computer networks, determining that the given computer network is a public network based on a connection record of the device, the connection record indicating whether the device previously connected to a different computer network (i) for a longer duration than connecting to the given computer network and/or (ii) more frequently than connecting to the given computer network.

In yet another aspect, the disclosure features a computer-implemented method including obtaining, for each user of a plurality of users, an email dataset including (i) an indication that the user opened or read an email from an email service provider and network information associated with a client with which the user opened or read the email, and/or (ii) a user identifier including a user email address and/or web account information. The method can include obtaining a plurality of Internet Protocol (IP) addresses associated with the entity; determining, for a plurality of computer networks associated with the entity, whether each computer network includes a public network or a private network based on the email datasets; and assessing a cybersecurity state of the entity based on an evaluation of security characteristics of the IP addresses attributed to the private network, excluding security characteristics of the IP addresses attributed to the public network.

Various embodiments of the exemplary method can include one or more of the following features. The network information can indicate a first computer network in which the client was used to open or read the email. The method can further include comparing (i) the first computer network to (ii) at least a second computer network to which the user belongs; and if the first computer network is not the second computer network, determining that the computer network(s) includes a public network. The user identifier can indicate a first computer network. The method can include comparing (i) the first computer network to (ii) at least a second computer network to which the user belongs; and, if the first computer network is not the second computer network, determining that the computer network is a public network. The method can include obtaining, for one or more computer networks associated with an entity, a network dataset including one or more service set identifiers (SSIDs); and determining whether each of the computer networks includes a public network or a private network based on the network dataset. Determining whether each of the computer networks includes a public network or a private network based on the network dataset can include determining whether the SSID includes a term including: "guest", "public", "visit", "byod", "free", "customer", and/or "personal", in which the term is in a natural language.

The method can include obtaining, for each device of a plurality of devices, a device dataset including: (a) cookies, (b) device fingerprints, and/or (c) a device identifier; and determining whether each of the computer networks includes a public network or a private network based on one or more device datasets. Determining whether each of the computer networks includes a public network or a private network based on the device dataset(s) can include, for a given network of the plurality of computer networks, determining that the given computer network is a public network based on a connection record of the device. The connection record can indicate whether the device previously connected to a different computer network (i) for a longer duration than connecting to the given computer network and/or (ii) more frequently than connecting to the given computer network.

DETAILED DESCRIPTION

Figure 1:
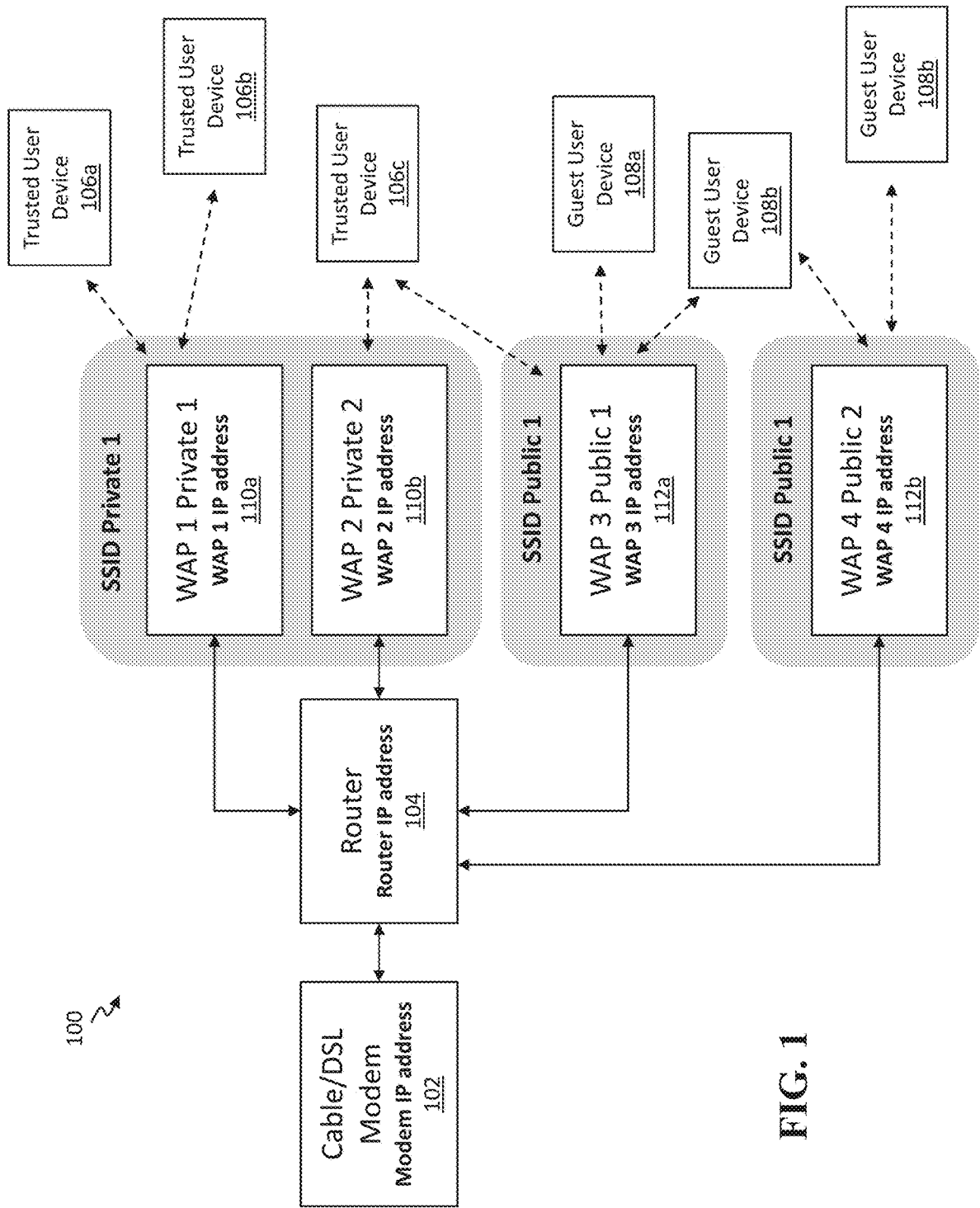
FIG. 1 is a diagram of an exemplary computer network for an entity.

Disclosed herein are exemplary embodiments of systems and methods for assessing the cybersecurity state of entities based on characterization of the entities' computer networks. Entities can include corporations, schools, governments, individuals, etc. In some embodiments, by identifying entities' computer networks as public or private and evaluating related security characteristics, entities can be more accurately rated as to their security risks and/or security record.

Computer networks may be wired or wireless. In some embodiments, a private network can be a host network, a secured network, etc. (e.g., a virtual private network (VPN), an enterprise private network (EPN), a personal area network (PAN), etc.). In some embodiments, a public network can be a guest network, an unsecured network, etc. (e.g., a wide-area network (WAN), a metropolitan area network (MAN), etc.). Some types of networks may have both public or private variants.

Entities may have only private network(s), only public network(s), or both private network(s) and public network(s). In some embodiments, if only private networks are identified for the entity, then the cybersecurity state (e.g., security rating) of the entity can be based solely on the identified private network(s). For instance, the entity's security rating can be limited to the security characteristics of the identified private network(s). In some embodiments, if both private and public network(s) are identified for the entity, then the security rating of the entity can be based on the identified private network(s) (and not based on the public network). For instance, the cybersecurity state (e.g., security rating) can be based on the security characteristics of the identified private network(s) while excluding some or all of the security characteristics of the identified public network(s).

Any of the below-described exemplary methods and systems can be used alone or in combination to characterize entities' computer networks and determine the cybersecurity state of the entities. The methods and systems can include obtaining network dataset(s), device dataset(s), and/or email dataset(s) to characterize entities' computer networks. In some embodiments, one dataset may be used to enrich other datasets. For example, the network dataset(s) may be combined with the device dataset(s) and/or email dataset(s) to determine with greater confidence whether a network is a public network (as compared to using the network dataset alone), as each dataset can provide a different context into usage patterns of the networks and the labels that the entities may have applied onto those networks. For example, an IP address (associated with an entity) with high device turnover observed in combination with the SSID of the network including the term "guest" can lend a higher confidence to the conclusion that the network is a public network as compared to each of those two observations in isolation.

Network Characterization Via SSIDs

In some embodiments, entity computer networks can be characterized via the service set identifiers (SSIDs) associated with the computer networks. An SSID is the primary name for a wireless network (e.g., a wireless local area network (WLAN), Wi-Fi, etc.) given to it by the entity that maintains the network. For example, SSIDs that belong to public networks may include one or more terms from the following non-exhaustive, non-limiting list: "guest", "public", "visit", "byod", "free", "customer", "personal", "open", "unsecured", etc. Note that any of the terms used herein can be represented in any natural language or dialect (e.g., English, Spanish, Mandarin, Urdu, German, etc.) Example SSIDs for public networks may be: "Corporate_Guest", "Municipal-Public2", "Unsecured_CityUniversity", "SHOPwireless_customer", "VisitorWIFI-cafe", "gym_free", etc. By contrast, SSIDs for private networks may not be broadcast or may include one or more terms from the following non-exhaustive, non-limiting list: "secure", "private", "host", "intranet", etc. Alternatively, SSIDs for private networks may not include any terms indicative that the type of the network is private.

In some embodiments, the system can process the characters of an SSID of a network to determine whether it is a public or private network. Table 1 lists examples of case-insensitive terms or "tags" used in public network SSIDs and associated processing logic. For example, the system can determine whether lowercase version of the SSID includes the term "guest" or "visit".

TABLE 1

Examples of "tags" used in public network SSIDs and associated processing logic.

| Guest Tag | Tagging Logic |
|---|---|
| guest | lower(ssid) contains "guest" |
| public | lower(ssid) contains "public" & lower(ssid) !contains "republic" |
| visit | lower(ssid) contains "visit" |
| byod | lower(ssid) contains "byod" |
| free | lower(ssid) contains "free" II with space |
| customer | lower(ssid) contains "customer" |
| personal | lower(ssid) contains "personal" |

FIG. 1 illustrates an exemplary computer network 100 for an entity. The exemplary network can include a modem 102 (e.g., a cable modem, a digital subscriber line (DSL) modem, etc.) configured to connect the network to the Internet and a router 104 configured to create the network. The router 104 can connect directly to exemplary trusted user devices 106a-106c (collectively referred to as 106) and exemplary guest user devices 108a-108b (collectively referred to as 108). In some embodiments, the router 104 is connected to one or more wireless access points (WAP(s)) that are each configured to create a wireless local area network (WLAN) for connecting to user devices 106 and/or 108. Each network can have its own SSID; alternatively, two or more networks may share an SSID. In some embodiments, WAP(s) can be connected to a switch or hub to create the WLAN(s). WAP(s) can create private networks 110a-110b (collectively referred to as 110) and/or public networks 112a-112b (collectively referred to as 112).

Figure 2:
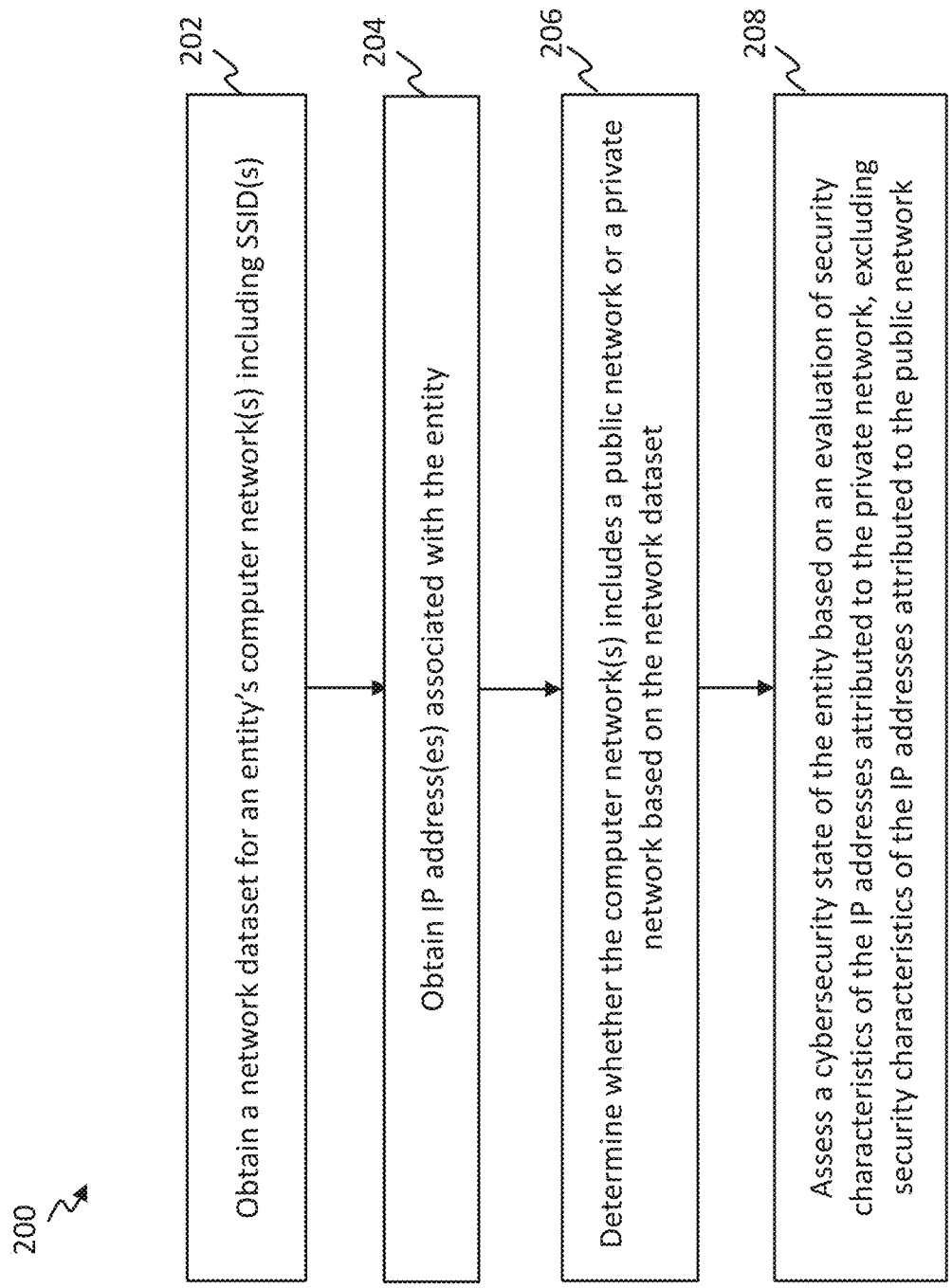
FIG. 2 is a flowchart of an exemplary method for assessing the cybersecurity state of entities based on identification of computer networks via service set identifiers (SSIDs).

FIG. 2 is a flowchart of an exemplary method 200 for assessing cybersecurity state of entities based on identification of computer networks via service set identifiers (SSIDs). In step 202, a network dataset is obtained for one or more computer networks associated with an entity. An exemplary network dataset can include one or more SSID(s) of the computer network(s). In step 204, Internet Protocol ((IP) address(es)) for the entity can be obtained. In some embodiments, the SSIDs and the IP addresses can be obtained separately and/or obtained from separate sources. In some embodiments, SSIDs may be drawn from a third-party data provider via, e.g., an application programming interface (API) or software development kit (SDK). In some embodiments, a filter may be applied to the data from the data source to remove data associated with service provider-type entities (e.g., universities, technology services companies, etc.). This can be beneficial in avoiding IP addresses for the service provider-type entities when the entity using the network is different than the service provider associated with the IP address. In some embodiments, one or more SSIDs of common public networks (e.g., belonging to a municipality or utility company) may be obtained and blacklisted such that the IP address of an entity is not attributed to the common public network. In some embodiments, one or more IP addresses may be blacklisted. Examples of how IP addresses for entities may be obtained are discussed below under heading "IP addresses and Associated Security Characteristics."

In some embodiments, multiple network datasets can be obtained for the same network. Each network dataset may be associated with a unique time. For example, each network dataset may include a timestamp indicating the time of day, day, month, etc. that the data was collected. In some cases, obtaining multiple network datasets can be beneficial for ensuring that the same SSID is associated with the network and thereby avoiding a false association. In some embodiments, the system can determine whether the computer network is a public or a private network after at least two network datasets (each dataset associated with a unique time) are obtained. For example, the system can determine that a particular computer network is a public network based on the same SSID after three or more days of data indicating as such.

In step 206, the system can determine whether each computer network includes a public and/or private network based on the network dataset (e.g., including each network's associated SSID). In some embodiments, the SSID can be processed to determine whether the SSID includes one or more terms indicating that it may belong to a public network. For example, the SSID may be analyzed to determine whether it includes one or more of the terms "guest", "public", "visit", "byod", "free", "customer", and/or "personal".

In some embodiments, the selection of probable SSIDs that are public networks can be improved by using information and/or network context already known about the entity. For example, by mapping known SSIDs to known entities, and grouping by (i) one or more characteristics of the entity (e.g., industry, services offered, products offered, etc.) and/or (ii) the distinct count of entities for which those SSIDs or semantics of the SSID appear, the exemplary system can identify instances in which the SSID or semantics of the SSID is commonly used across two or more entities. SSIDs that are commonly used across entities, or SSIDs that share similarities with one another, may be an indication of a specific theme of the network and expressed within the SSID (e.g., "guest", "public", "visit", "byod", "free", "customer", etc.). Conversely, SSIDs that are distinctly unique may be an indication of the SSID being associated with a private network.

In some embodiments, this dataset could then be ingested into a machine learning algorithm (e.g., a predictive model, a logistical regression model, a classifier, a decision tree, a random forest of decision trees, an artificial neural network, a support vector machine, a Bayesian network) to subsequently classify any arbitrary SSID as a probable public network. Any suitable techniques (e.g., predictive modeling processes, machine learning processes, etc.) may be used to fit the machine learning model to the data and/or to tune (e.g., optimize) the model, including but not limited to cross-validation and hyper-parameter tuning. In some embodiments, a machine learning model can be trained on a dataset of SSIDs, an indicated of whether the SSID is associated with a public or private network. This model can then be used to determine whether a given SSID is likely to be a public or a private network.

In some embodiments, once the public and/or private networks are identified, an IP address is attributed to the identified network. For example, once an SSID of a network reveals that the network is a public network, the system can determine which IP address should be attributed to the network based on the obtained data.

In some embodiments, once the IP address is attributed to the identified network, one or more security characteristics of each private network's IP address are determined. In some embodiments, the security characteristics of the IP address of each identified network (e.g., public and/or private) are determined. In other embodiments, the security characteristics of the IP addresses associated with only the private networks are determined (and not the public networks). Examples of security characteristics of computer network(s) and associated IP address(es) are described further below under heading "IP Addresses and Associated Security Characteristics."

In step 208, the cybersecurity state (e.g., security rating, level of security, etc.) of the entity can be assessed based on an evaluation of the security characteristics of the IP address(es) attributed to a private network. The evaluation can exclude the security characteristics of the IP address(es) attributed to the public network. In some embodiments, if the security characteristics of the IP address(es) attributed to the public network are determined, they need not be evaluated in order to be excluded. Examples of determining the security ratings of entities are described further below under heading "Security Ratings of Entities." For example, an entity's security rating may be "dragged down" by the relatively negative security characteristics of the public network, as public networks are typically less secure. Therefore, it can be beneficial to exclude the security characteristics of public network(s) so that an entity can be evaluated based on those associated with its more secure or more controlled private network(s).

Network Characterization Via User Device Activity

In some embodiments, entity computer networks can be identified via user device activity. As used herein, user devices can include any user device that can be connected to a computer network via a wired or wireless connection. For example, user devices can include mobile phones, smart phones, smart watches, laptops, notebook computers, desktop computers, tablets, Internet-of-things (IoT) devices, etc. For instance, user devices can temporarily connect to one or more computer network over a given time period. This is especially true for mobile devices (e.g., smart phones, laptops, tablets, smart watches, etc.) that may connect and disconnect from multiple networks in a given day. For example, a user's device can start with a connection to a home network (which is typically a private network), then connect to a work network (which is typically a private network) during the user's work day. If, for example, the user goes to a gym or a café after work, her device may connect to the gym's or the café's guest network (which is typically a public network) before returning to the user's home network.

In some embodiments, various types of device activity can reveal that a particular network is a public network. For example, some airports have public computer networks that may receive thousands of distinct user and device connections per day that are only usually observed for one distinct day within a short-time window considering that many individuals are only at an airport transiently. In another example, device datasets for some corporations' guest networks may reveal classes of user devices whose presences on the network are brief (e.g., for users employed by other, third-party corporations). In another example, devices of guests staying at hotels are expected to have a distinct, but continuous and brief presence on the hotel network before physically departing. The guests' usage pattern is therefore different than those user devices that operate as part of the hotel systems (e.g., hotel employee devices or hotel-owned devices).

In some embodiments, the device dataset can include a connection record of a device. The connection records can indicate whether the device previously connected to a different computer network (i) for a longer duration than connecting to the given computer network and/or (ii) more frequently than connecting to the given computer network. For instance, determining whether the device is non-transient in a different network (e.g., network A of entity A) can be used to determine whether the device is transient for a particular entity's network (e.g., network B of entity B). For instance, a device dataset for network A of entity A may reveal one or more devices X that frequently and/or persistently connect (e.g., in a "non-transient" manner) to network A (e.g., during a particular time window, for a particular time period, at a workplace, at a school, etc.). Another device dataset for network B of entity B may reveal that that the same device(s) X are connected to network B. However, by knowing that device(s) X are non-transient for network A, it may be possible to infer that the device(s) are transient for network B. For example, if device X is found to connect to a school's computer network during daytime hours and the same device X appears in the network for a café from time to time, it is likely that the device is transient in the café network and that the café network is likely public.

In some embodiments, device activity may not easily reveal the type of network without additional information. In another example, many entities have network policies that allow employee-owned mobile devices onto the entity's public networks only (and not onto the entity's private network). In this case, it may be helpful to know about the company network policy lest the network be determined a private network.

Thus, observing the device activity as the device accesses the Internet via various computer networks can reveal information about the networks themselves. Traces of device activity can be determined from the device cookies, fingerprints, and/or unique identifier(s). For example, the identifier of a device may take different forms, either individually or in combination with other identifiers, including but not limited to: a unique device identifier (UDID) as provided by the operating system of the device; an identifier provided by the manufacturer (e.g., a serial number); an identifier provided to a browser on the device (e.g., using a cookie); an identifier as provided by a mobile application on the device to the application itself (e.g., an application-specific unique identifier); an identifier associated to a device modem (e.g., an IMEI number); an identifier associated to the network interface (e.g., a MAC address); an identifier associated with the SIM card (e.g., the SIM number); an identifier associated with the telephony services (e.g., a phone number); and/or an international mobile subscriber identity (IMSI) number. A form of identifier associated with a device as provided in the data set may be generic and may be present in other unrelated devices that are not in the data set. In some cases, the form of identifier may be unique to the data set itself, e.g., a salted hash of one or more other identifiers.

The system may obtain the above information (e.g., cookies, fingerprints, identifiers, etc.) from website operators, advertisement service providers, marketing service providers, email service providers, transaction facilitators, etc. The system can receive datasets including the IP address(es) for the network(s) to which the user's device has connected and determine the entities associated with these IP address(es).

In some embodiments, the system can determine characteristics of the network connections to the networks by the devices. The system may observe, collect, and/or receive one or more characteristics of connections, e.g., the number of devices that have connected, the number of unique devices that have connected (e.g., devices that connect and have not connected before or again), the duration of time for which the devices have connected, and/or the frequency of connection by the devices. The characteristics may depend on attributes of the network and/or entity including, e.g., the number of distinct IP addresses associated to the public network, the size of the entity (e.g., by revenue, by employee count, etc.), the entity's industry, and/or the particular products or services offered by the entity. For example, the system may determine that the network to which the devices are connected is a public network if there are many connected devices (e.g., at least 50 devices, hundreds of devices over a short time period, etc.), if the connection times are brief (e.g., lasting for less than a couple of hours), and/or infrequent (e.g., once per week or for a single instance). For example, the system can compare the entity's headcount or company size to the number of devices connected to determine whether more than an expected number (or expected order of magnitude) of devices have connected to the entity's network.

In some embodiments, the system may compare one or more of the above metrics to a pre-determined threshold.

Such a threshold may be determined using machine learning algorithms trained on data over time. For example, a network might be deemed to be a public network if the number of devices connected to the network is greater than a particular threshold (e.g., at least 1.5 times, at least twice, at least three times, at least five times, at least ten times, etc.) the number typically associated with the network. In another example, the system can compare a typical or expected connection duration of devices for the entity to a measured connection duration threshold to determine whether the devices have connected for shorter durations of time to the network. For example, a small business that offers public Wi-Fi may observe only a handful of connected user devices per week connecting to its public network. In contrast, an airport's public network may see thousands of user device connections per day.

Figure 3:
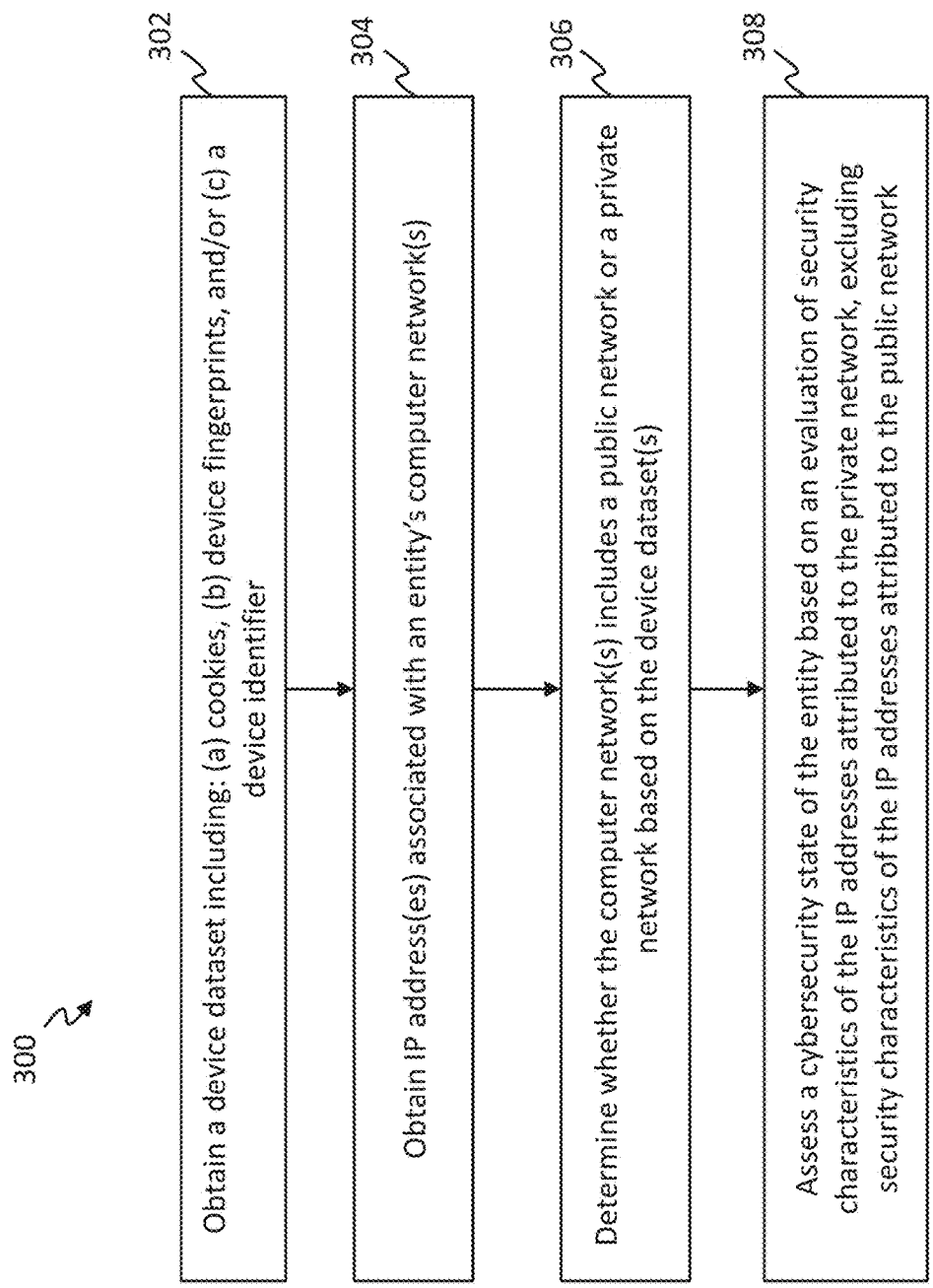
FIG. 3 is a flowchart of an exemplary method for assessing the cybersecurity state of entities based on identification of computer networks via device dataset(s).

FIG. 3 is a flowchart of an exemplary method 300 for assessing cybersecurity state of entities based on identification of computer networks via device dataset(s). In step 302 of method 300, a device dataset is obtained for each of one or more user devices. The device dataset(s) can include device cookies, device fingerprints, and/or device identifier(s). Examples of device identifiers and fingerprints can include those described above.

In step 304, IP address(es) associated with the entity can be obtained, for example, by the methods described in the below section titled "IP Addresses and Associated Characteristics."

In step 306, the system can determine whether the entity's computer network(s) include a public and/or private network based on the obtained device datasets. In some embodiments, the system can determine whether the device has connected to the entity's computer network(s) based on the obtained dataset for the device, as described above.

In some embodiments, once the public and/or private networks are identified, one or more security characteristics of each private network's IP address can be determined. In some embodiments, the security characteristics of the IP address of each identified network (e.g., public and/or private) are determined. Examples of security characteristics of computer network and associated IP address(es) are described further below. In some embodiments, once the public and/or private networks are identified, an IP address can be attributed to the identified network. For example, once the device dataset(s) reveal that the network is a public network, the system can determine which IP address(es) should be attributed to the public network based on the obtained data.

In some embodiments, once the IP address(es) are collected for a given network, the characteristics of each distinct IP address can be assessed to determine (i) the average connection duration of user devices and/or (ii) uniqueness of devices connected to the entity's network. This data can be compared to corresponding data of other IP addresses that are attributed to the entity. This analysis can provide a global understanding of the more frequently utilized networks of entity. For example, this analysis may reveal that one of an entity's public networks may be more frequented by guest devices as compared to another of the entity's public networks.

In step 308, the cybersecurity state (e.g., security rating, level of security, etc.) of the entity can be assessed based on an evaluation of security characteristics of the IP addresses attributed to a private network and by excluding security characteristics of the IP addresses attributed to a public network. Examples of determining the security ratings of entities are described further below under heading "Security Ratings of Entities."

Network Characterization Via Email-Related Data

In some embodiments, entity computer networks can be identified via email-related data (e.g., email activity, email address, etc.). Email-related data may be beneficial in determining the temporal nature of users and their devices' diversity on particular networks and/or the diversity of user identifier domain names observed on that network.

A user's email-related activity may be captured in one or more ways. For example, email service providers and/or email marketing services may collect and provide readability and/or delivery metrics of emails sent by their users (e.g., customers) to other users or entities. These metrics can be collected by the use of an image or other remote resource (also known as a "pixel") embedded in the outgoing email by the email service provider. The receiving email client fetches the pixel when a user opens and/or reads the email, which triggers information being sent to the email service provider. This information can include whether the email was opened and/or read by the recipient. In some cases, this can enable the email service provider to associate an IP address of the email client to the email address of the user. Therefore, when a user opens or reads her email on a device connected to an entity's network, information related to the entity's network is included in the email dataset. If, for example, the user opens or reads her email on an entity's public network, the information can include information related to the public network (e.g., configuration of the particular network via headers sent by client to the email service provider).

In some embodiments, identifiers can include those associated with user accounts used access a service (e.g., Software-as-a-Service (SaaS)). These accounts may be accessed via HyperText Transfer Protocol (HTTP), Internet Message Access Protocol (IMAP), Post Office Protocol 3 (POP3), or other protocols that collect and/or catalog users' email and/or user devices' IP addresses (e.g., the device's IP address as observed externally). Note that a user device's assigned IP address may differ from the device's externally observed IP address (e.g., due to network address translation (NAT) present in the Internet Protocol version 4 (IPv4) Internet).

The system may obtain the above information from website operators, advertisement service providers, marketing service providers, email service providers, transaction facilitators, etc. In some embodiments, the domain name (e.g., "CompanyA.com") of a user's email address (e.g., username@entityA.com) may be used in determining the entity associated with the user. For example, an email-related dataset can include observed data related to numerous devices and associated users. Additionally, if the IP addresses of those observations indicate that the observations belong to entity "Company A" and the domain names of the users' email addresses belong to a diverse set of entities, the system may determine, based on this information, that the network is a public network.

In some embodiments, the user identifier can include the user's email address or a derived form (e.g., a hash) of the user's email address. In some embodiments, a user identifier can include information related to one or more web accounts associated with the user. Web account information can include the user's name (e.g., "Jane Smith"), an email address (e.g., "janesmith@example.com"), a log-in or account name associated with an entity (e.g., "jsmith" for logging into Entity A's website), etc. In some embodiments, user identifiers that are used in registration to websites (e.g., for log-in purposes or for creating an account) can be obtained. In some embodiments, web account information can include activity logs of websites or software services associated with a user identifier.

In some embodiments, if the client network information indicates a particular computer network in which the client was used to open or read the email, the method can include comparing the particular computer network to another computer network to which the user belongs. If the particular computer network is not the other computer network, the method can include determining that the computer network is a public network. In some embodiments, if the user identifier indicates a particular computer network, the method can include comparing the first computer network to another computer network to which the user belongs. If the particular computer network is not the other computer network, the method can include determining that the computer network is a public network.

Figure 4:
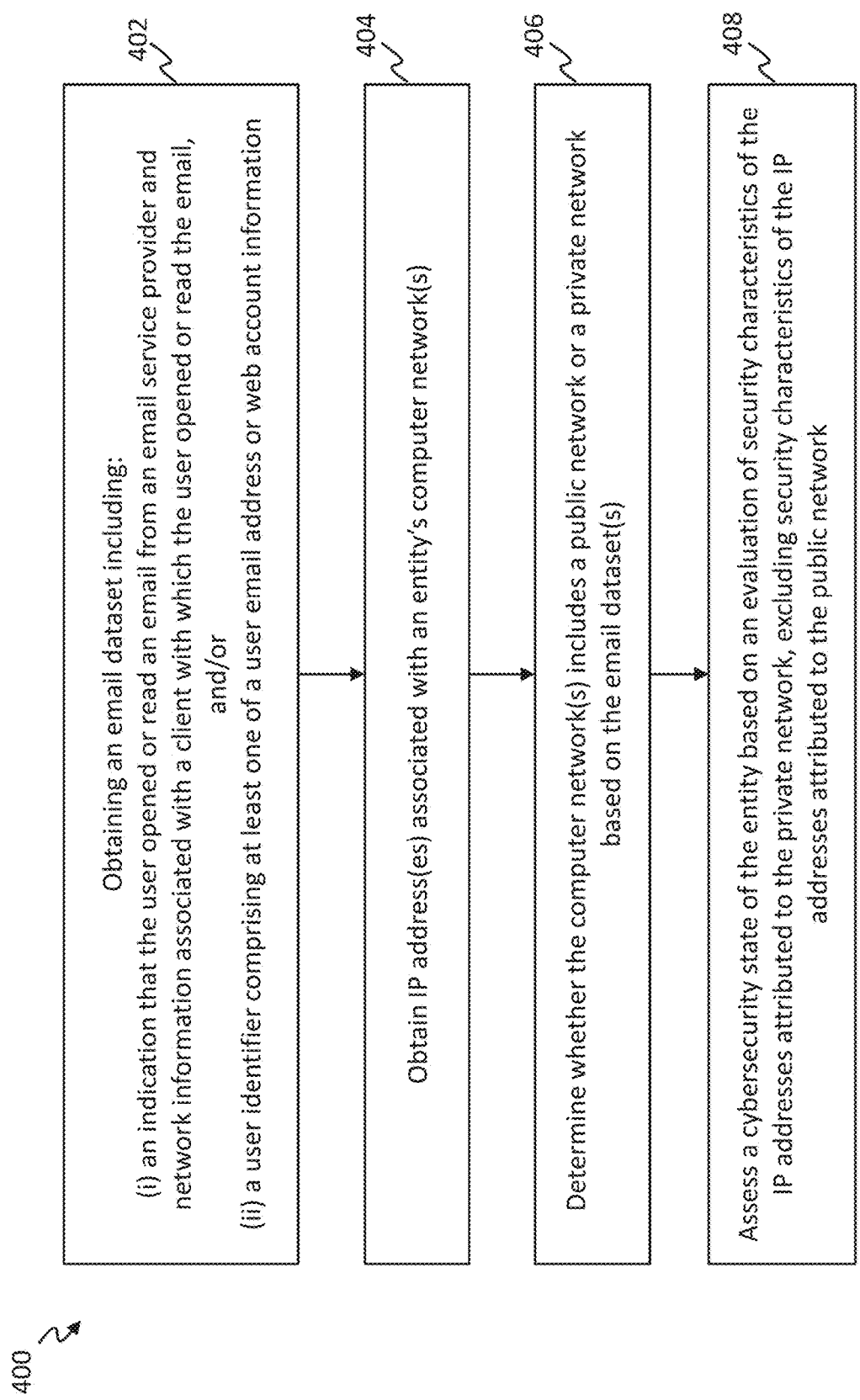
FIG. 4 is a flowchart of an exemplary method for assessing the cybersecurity state of entities based on identification of computer networks via email dataset(s).

FIG. 4 is a flowchart of an exemplary method 400 for assessing the cybersecurity state of entities based on identification of computer networks via email dataset(s).

In step 402 of method 400, an email dataset is obtained for a set of users. In some embodiments, the email dataset(s) may include an indication that the user opened or read an email from an email service provider. In some embodiments, the email dataset(s) may include network information associated with a client with which the user opened or read the email, as described above. In some embodiments, the email dataset(s) may include a user identifier including a user email address and/or web account information, as discussed above.

In step 404, IP address(es) can be obtained for the entity, as described in further detail below heading "IP Addresses and Associated Security Characteristics."

In step 406, the system can determine whether the computer network(s) include a public network or a private network based on the email dataset(s). For example, as described above, the information related to the entity's network included in the email dataset can be used.

In some embodiments, once the public and/or private networks are identified, certain security characteristics of each private network's IP address are determined. In some embodiments, the security characteristics of the IP address of each identified network (e.g., public and/or private) are determined. Examples of security characteristics of computer network and associated IP address(es) are described further below. In some embodiments, once the public and/or private networks are identified, an IP address is attributed to the identified network. For example, once the device dataset(s) reveal that the network is a public network, the system can determine which IP address should be attributed to the network based on the obtained data.

In step 408, the cybersecurity state (e.g., security rating, level of security) of the entity can be assessed based on an evaluation of security characteristics of the IP address(es) attributed to the private network(s). The evaluation can exclude characteristics of the IP address(es) attributed to the public network(s). Examples of determining the security ratings of entities are described further below under heading "Security Ratings of Entities."

IP Addresses and Associated Characteristics

In some embodiments, having identified whether an entity's network is public or private, the system can determine the security characteristics associated with that network. For example, the security characteristics associated with the network can be gleaned from the Internet Protocol (IP) address(es) attributed to that network. Examples of determining and/or evaluating the security characteristics of entities and associated IP addresses can be found in at least U.S. Publication No. 2016/0205126 published on Jul. 14, 2016 and titled "Information Technology Security Assessment System," U.S. Pat. No. 9,973,524 issued on May 15, 2018 and titled "Information Technology Security Assessment System," and U.S. Pat. No. 9,830,569 issued on Nov. 28, 2017 and titled "Security Assessment Using Service Provider Digital Asset Information," all of which are incorporated herein by reference in their entireties. Examples of mapping IP addresses to entities can be found in U.S. Publication No. 2018/0375822 published on Dec. 27, 2018 and titled "Methods for Mapping IP Addresses and Domains to Organizations Using User Activity Data," which is incorporated herein by reference in its entirety.

In general, Regional Internet Registries (RIRs) manage the allocation and registration of Internet number resources (IP Addresses, Autonomous System Numbers, etc.) within a particular region of the world. There are five RIRs—ARIN for North America, AfriNIC for Africa, APNIC for Asia Pacific, RIPE for Europe, Middle East, Central Asia, and LACNIC for Latin America.

The RIRs allocate the address space to service providers, corporations, universities, etc. The RIRs provide various interfaces that enable queries of the RIR to determine who owns a given IP address. It is also possible to query the database by an entity name and get a list of IP addresses allocated to that entity. Despite lack of standardization of entity names in the RIR databases, well-chosen queries can result in a very high coverage of addresses owned by an entity.

Another problem is that RIRs often allocate large chunks of addresses to Internet Service Providers (ISPs) who go on to allocate smaller address spaces to their customers. ISPs are under no obligation to report this data back to anyone. Most small companies contract with their local ISP for Internet access and don't obtain addresses from RIRs.

These problems are addressed by the entity ownership collection system (described below) being configured to execute various heuristic processes including the following non-limiting list of examples:

1. Using the 'dig' (http://linux.die.net/man/l/dig) tool to determine any IP information published by an entity. The dig tool takes the domain name of the entity as an argument. For example, execution of 'dig a.com ANY' returns all IP information published by the entity a.com.

2. Use the IP addresses and domain names published to find ranges of IP addresses actually used. ISPs almost always allocate addresses in size of powers of 2 (2, 4, 8 etc.). Knowing one IP address allows probing around that space. The 'whois' (http://linux.die.net/man/l/whois) tool can be used to determine ownership of neighborhood addresses.

3. Even if the entity does not publish any IP information that can be retrieved through dig, most entities have servers whose names may be guessed. Mail servers for the domain a.com often have the name mail.a.com, SMTP servers tend to be smtp.a.com, FTP servers tend to be ftp.a.com etc. Using a tool like nslookup, the entity ownership collection system can verify if any of these common names are in use by the entity.

4. If an IP address is found, the system is configured to probe around the address (such as in step 2) to determine any addresses in the neighborhood owned by that entity.

5. Searching around the website of the company often gives a hint of other servers hosted by the company (ex: reports.a.com) which can be used as a starting point for search.

The entity ownership collection system gathers information about an entity. This includes information about which IT assets an entity owns, controls, uses, or is affiliated with. Examples of asset ownership include control and operation of an Internet Protocol (IP) network address range or computer services such as web servers residing within that address block. Information about entities also includes relationships such as subsidiaries, affiliates, etc., that describe entity association.

Security Ratings of Entities

In some embodiments, the security characteristics of an entity's network(s) can be evaluated to assess the entity's cybersecurity states. Specifically, the security characteristics can be evaluated to determine the entity's security rating. The entity's security rating can be provided to the entity as a measure of that entity's risk of security breaches and/or past security record.

In various embodiments, networks can be characterized for each individual entity. In some embodiments, in parent-child entity relationships (e.g., parent company and subsidiary company), an IP address is attributed to a parent entity's subsidiary and the parent entity. For security ratings purposes, an IP address and/or computer network would be associated with both the entity and any other entities that are parents of that entity.

Examples of determining and/or evaluating the security characteristics of entities and associated IP addresses, and determining security ratings of entities based on the security characteristics can be found in at least U.S. Publication No. 2016/0205126 published on Jul. 14, 2016 and titled "Information Technology Security Assessment System," U.S. Pat. No. 9,973,524 issued on May 15, 2018 and titled "Information Technology Security Assessment System," U.S. Pat. No. 9,830,569 issued on Nov. 28, 2017 and titled "Security Assessment Using Service Provider Digital Asset Information," and U.S. patent application Ser. No. 16/514,771 filed on Jul. 17, 2019 and titled "Systems and methods for generating security improvement plans for entities", all of which are incorporated herein by reference in their entireties.

In some embodiments, determining security risk of entities uses externally observable information as proxies for (i) the effectiveness of the overall security performance of the policies and controls that entity implements and exercises and/or (ii) the vulnerability of the entity to security risk. This externally observable information can be categorized into observable subject areas, or "vectors", which can each be independently determined and/or characterized. For example, one possible proxy for entity vulnerability is the number of entity-owned IP addresses which are reported by third parties to be malicious. The greater the number of reports, the more likely the particular entity was vulnerable and had been compromised. Examples of subject areas ("vectors") may include:

- an amount of capital investment in the security of the entity;
- a measure of employee training in the security of the entity;
- a measure of organization of entity personnel dedicated to information security;
- an amount of the entity's budget dedicated to information security;
- a number and/or severity of botnet infection instances of a computer system associated with the entity;
- a number of spam propagation instances originating from a computer network associated with the entity;
- a number of malware servers associated with the entity;
- a number of potentially exploited devices associated with the entity;
- a number of hosts authorized to send emails on behalf of each domain associated with the entity;
- a determination of whether a DomainKeys Identified Mail (DKIM) record exists for each domain associated with the entity and/or a key length of a public key associated with a Domain Name System (DNS) record of each domain associated with the entity;
- an evaluation of a Secure Sockets Layer (SSL) certificate and/or a Transport Layer Security (TLS) certificate associated with a computer system of the entity;
- a number and/or type of service of open ports of a computer network associated with the entity;
- an evaluation of security-related fields of an header section of HTTP response messages of hosts associated with the entity;
- a rate at which vulnerabilities are patched in a computer network associated with the entity;
- an evaluation of file sharing traffic originating from a computer network associated with the entity; and/or
- a number of lost records and/or sensitivity of information in the lost records in a data breach of a computer system associated with the entity.

In some embodiments, received data for an entity can include two or more subject areas (e.g., of those listed above). In some cases, determining the security rating for an entity can include determining the relationship between the first subject area and the second subject area. This relationship can be stored in a database and accessed for use. For example, the number of botnet infections of an entity may be correlated with the number of potentially exploited devices associated with the entity. This correlation can be stored and referenced in the future. In some embodiments, the security characteristic of an entity is associated with, related to, or equal to the security rating of that entity (e.g., on a scale from 300 to 900, as provided by BitSight Technologies, Inc., Boston, Mass.).

In some embodiments, to compute the security ratings for an entity, obtained data pertaining to the IT assets owned by that entity may be aggregated. For example, IT assets can include the IP addresses controlled by the entity and obtained data can include the activity associated with those IP addresses. To determine externally observable information about IP address-based assets, one or more IP addresses can be associated with an entity. The data may be processed to determine additional information. For example, processing may yield a list of IP addresses for an entity that has demonstrated suspicious or malicious behavior or fails to follow best security practices for the given reference data point. Similar methods can be used for other types of assets, e.g., domain-based assets, or other information for which an asset can be determined to be associated to an organization. Using these techniques, information about that asset can be associated with the entity.

The exemplary security ratings systems and methods may be configured to account for differences in data sources and types. Given each data source's potentially unique insight of an entity, there can be two or more techniques used to take advantage of the respective data. Data source-specific modeling techniques may be applied to some or all of the data sources to demonstrate feasibility and validate the approach for each data source and modeling technique.

In some embodiments, the combination of two or more vectors may produce a security rating that reflects the effectiveness of an entity's security efforts. The determination of individual vectors and the overall security rating can be influenced by security best-practices as promoted by standardized and accepted cybersecurity frameworks. In some embodiments, evidence of security compromise can be used to understand the specific impact the individual vectors have on the security rating of the entity. For instance, correlation between sources of externally observed information can be used to determine the impact of vectors. For example, the vectors representing evidence of compromised workstations (owned or controlled by an entity) may represent a significant portion of the entity's ability to implement security controls correctly, and thus may influence the entity's security rating more than other types of information.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 5:
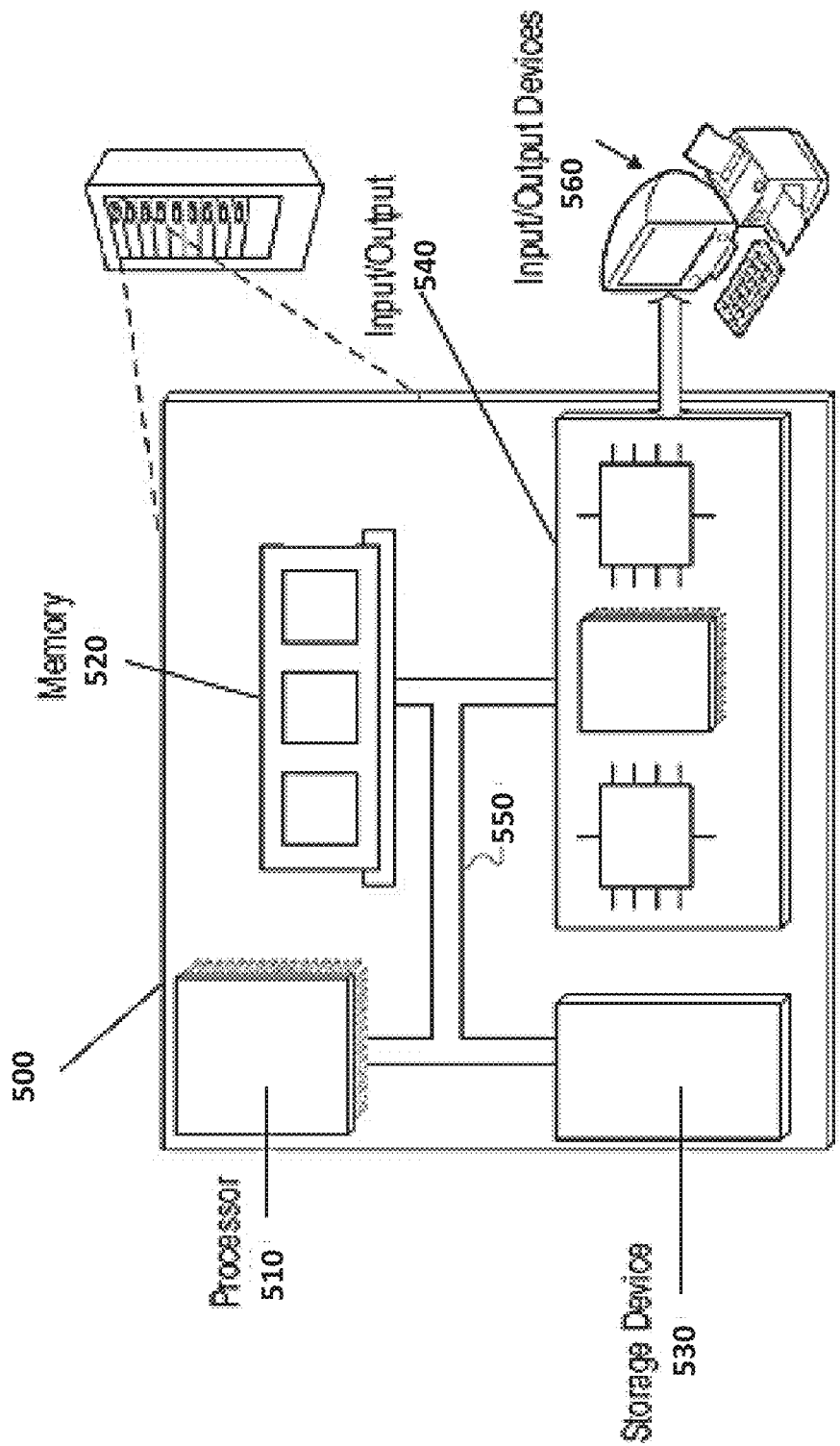
FIG. 5 is a block diagram of an example computer system that may be used in implementing the technology described herein.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method comprising:
   obtaining, for at least one computer network of a plurality of computer networks associated with an entity, a network dataset comprising a service set identifier (SSID);
   obtaining a plurality of Internet Protocol (IP) addresses associated with the entity;
   determining whether each of the plurality of computer networks comprises a public network or a private network based on the network dataset; and
   assessing a cybersecurity state of the entity based on an evaluation of security characteristics of the IP addresses attributed to the private network, excluding security characteristics of the IP addresses attributed to the public network.

2. The method of claim 1, wherein determining whether each of the computer networks comprises a public network or a private network based on the network dataset comprises:
   determining whether the SSID includes a term comprising at least one of: "guest", "public", "visit", "byod", "free", "customer", or "personal", wherein the term is in a natural language.

3. The method of claim 1, further comprising:
   obtaining, for at least one computer network of the plurality of computer networks of the entity, a plurality of network datasets including the network dataset, wherein each network dataset comprises an SSID and is from a unique time,
   wherein the determining whether each of the computer networks comprises a public network or a private network based on the network dataset is performed for at least two network datasets of the plurality of network datasets.

4. The method of claim 3, wherein the time corresponds to a day and wherein the determining whether each of the computer networks comprises a public network or a private network based on the network dataset is performed for at least three network datasets of the plurality of network datasets.

5. The method of claim 1, further comprising:
   obtaining one or more SSIDs of common public networks; and
   blacklisting the SSIDs of the common public networks such that at least one IP address is not attributed to one or more of the common public networks.

6. The method of claim 1, further comprising:
   obtaining, for each device of a plurality of devices, a device dataset comprising at least one of: (a) cookies, (b) device fingerprints, or (c) a device identifier; and
   determining whether each of the computer networks comprises a public network or a private network based on at least one device dataset.

7. The method of claim 6, wherein determining whether each of the computer networks comprises a public network or a private network based on at least one device dataset comprises:
determining whether the at least one device has connected to at least one computer network of the plurality of computer networks.

8. The method of claim 7, wherein, if the device has connected to the at least one computer network, the determining whether each of the computer networks comprises a public network or a private network based on at least one device dataset comprises:
determining a connection duration and/or connection frequency of the device connected to the at least one computer network in a given time period.

9. The method of claim 7, further comprising:
comparing (i) a first number of devices of the plurality of devices that has connected to the at least one computer network to (ii) a second number of devices typically associated with the at least one computer network; and
determining that the at least one computer network comprises a public network if the first number is greater than the second number.

10. The method of claim 6, wherein the determining whether each of the computer networks comprises a public network or a private network based on the at least one device dataset comprises:
for a given network of the plurality of computer networks, determining that the given computer network is a public network based on a connection record of the device, the connection record indicating whether the device previously connected to a different computer network (i) for a longer duration than connecting to the given computer network and/or (ii) more frequently than connecting to the given computer network.

11. The method of claim 1, further comprising:
obtaining, for each user of a plurality of users, an email dataset comprising at least one of:
(i) an indication that the user opened or read an email from an email service provider and network information associated with a client with which the user opened or read the email, or
(ii) a user identifier comprising at least one of a user email address or web account information; and
determining whether each of the computer networks comprises a public network or a private network based on at least one email dataset.

12. The method of claim 11, wherein the network information indicates a first computer network in which the client was used to open or read the email, the method further comprising:
comparing (i) the first computer network to (ii) at least a second computer network to which the user belongs; and
if the first computer network is not the second computer network, determining that the computer network is a public network.

13. The method of claim 11, wherein the user identifier indicates a first computer network, the method further comprising:
comparing (i) the first computer network to (ii) at least a second computer network to which the user belongs; and
if the first computer network is not the second computer network, determining that the computer network is a public network.

14. The method of claim 1, wherein determining whether each of the plurality of computer networks comprises a public network or a private network based on the network dataset further comprises:
providing at least a portion of the network dataset as input to a trained classifier to determine whether the network is a public network or a private network.

15. A computer-implemented method comprising:
obtaining, for each device of a plurality of devices, a device dataset comprising at least one of: (a) cookies, (b) device fingerprints, or (c) a device identifier;
obtaining a plurality of Internet Protocol (IP) addresses associated with the entity;
determining, for a plurality of computer networks associated with the entity, whether each of the computer networks comprises a public network or a private network based on the device datasets; and
assessing a cybersecurity state of the entity based on an evaluation of security characteristics of the IP addresses attributed to the private network, excluding security characteristics of the IP addresses attributed to the public network.

16. The method of claim 15, wherein determining whether each of the computer networks comprises a public network or a private network based on the device datasets comprises:
determining whether the device of the plurality of devices has connected to the computer network based on the device datasets.

17. The method of claim 16, wherein, if the device has connected to the at least one computer network, the determining whether each of the computer networks comprises a public network or a private network based on the device datasets comprises:
determining a connection duration and/or connection frequency of the device connecting to the computer network in a given time period.

18. The method of claim 16, further comprising:
comparing (i) a first number of devices of the plurality of devices that has connected to the computer network to (ii) a second number of devices typically associated with the computer network; and
determining that the computer network comprises a public network if the first number is greater than the second number.

19. The method of claim 15, further comprising:
obtaining, for at least one computer network of an entity, a network dataset comprising at least one service set identifier (SSID); and
determining whether each of the computer networks comprises a public network or a private network based on the network dataset.

20. The method of claim 19, wherein determining whether each of the computer networks comprises a public network or a private network based on the at least one SSID comprises:
determining whether the SSID includes a term comprising at least one of: "guest", "public", "visit", "byod", "free", "customer", or "personal", wherein the term is in a natural language.

21. The method of claim 15, wherein the determining whether each of the computer networks comprises a public network or a private network based on the device datasets comprises:
for a given network of the plurality of computer networks, determining that the given computer network is a public network based on a connection record of the device, the connection record indicating whether the device previously connected to a different computer network (i) for a longer duration than connecting to the given computer network and/or (ii) more frequently than connecting to the given computer network.

22. A computer-implemented method comprising:
obtaining, for each user of a plurality of users, an email dataset comprising at least one of:
(i) an indication that the user opened or read an email from an email service provider and network information associated with a client with which the user opened or read the email, or
(ii) a user identifier comprising at least one of a user email address or web account information;
obtaining a plurality of Internet Protocol (IP) addresses associated with the entity;
determining, for a plurality of computer networks associated with the entity, whether each computer network comprises a public network or a private network based on the email datasets; and
assessing a cybersecurity state of the entity based on an evaluation of security characteristics of the IP addresses attributed to the private network, excluding security characteristics of the IP addresses attributed to the public network.

23. The method of claim 22, further comprising:
obtaining, for at least one of a plurality of computer networks associated with an entity, a network dataset comprising at least one service set identifier (SSID); and
determining whether each of the computer networks comprises a public network or a private network based on the network dataset.

24. The method of claim 23, wherein determining whether each of the computer networks comprises a public network or a private network based on the network dataset comprises:
determining whether the SSID includes a term comprising at least one of: "guest", "public", "visit", "byod", "free", "customer", or "personal", wherein the term is in a natural language.

25. The method of claim 22, wherein the user identifier indicates a first computer network, the method further comprising:
comparing (i) the first computer network to (ii) at least a second computer network to which the user belongs; and
if the first computer network is not the second computer network, determining that the computer network is a public network.

26. The method of claim 22, wherein the network information indicates a first computer network in which the client was used to open or read the email, the method further comprising:
comparing (i) the first computer network to (ii) at least a second computer network to which the user belongs; and
if the first computer network is not the second computer network, determining that the at least one computer network comprises a public network.

27. The method of claim 22, further comprising:
obtaining, for each device of a plurality of devices, a device dataset comprising at least one of: (a) cookies, (b) device fingerprints, or (c) a device identifier; and
determining whether each of the computer networks comprises a public network or a private network based on at least one device dataset.

28. The method of claim 27, wherein the determining whether each of the computer networks comprises a public network or a private network based on the at least one device dataset comprises:
for a given network of the plurality of computer networks, determining that the given computer network is a public network based on a connection record of the device, the connection record indicating whether the device previously connected to a different computer network (i) for a longer duration than connecting to the given computer network and/or (ii) more frequently than connecting to the given computer network.

* * * * *